(12) United States Patent
Hollowell

(10) Patent No.: US 6,969,192 B1
(45) Date of Patent: Nov. 29, 2005

(54) PORTABLE X-RAY CASSETTE HOLDER FOR OPERATING ROOMS

(76) Inventor: Weems Hollowell, 9664 W. Rivercove Pl., Homosassa, FL (US) 34448

( * ) Notice: Subject to any disclaimer, the term of this patent is extended or adjusted under 35 U.S.C. 154(b) by 0 days.

(21) Appl. No.: 10/843,584

(22) Filed: May 12, 2004

(51) Int. Cl.[7] .............................................. G03B 42/02
(52) U.S. Cl. ..................................... 378/177; 378/167
(58) Field of Search ................................ 378/167, 177, 378/178, 179, 180, 182, 189; 250/491.1

(56) References Cited

U.S. PATENT DOCUMENTS

| | | | | |
|---|---|---|---|---|
| 3,705,984 | A | * | 12/1972 | Westenberger .............. 378/178 |
| 3,892,399 | A | * | 7/1975 | Cabansag ................... 378/178 |
| 4,352,197 | A | * | 9/1982 | Waerve ...................... 378/177 |
| 4,414,683 | A | * | 11/1983 | Robinson .................... 378/177 |
| 4,542,522 | A | | 9/1985 | Blais |
| 4,563,586 | A | * | 1/1986 | Jordan ........................ 378/189 |
| 6,151,732 | A | | 11/2000 | Heimbrook et al. |
| 6,450,684 | B2 | * | 9/2002 | Kobayashi .................. 378/177 |
| 6,899,459 | B1 | * | 5/2005 | McKenna ................... 378/177 |

* cited by examiner

Primary Examiner—Edward J. Glick
Assistant Examiner—Chih-Cheng Glen Kao
(74) Attorney, Agent, or Firm—Miles & Stockbridge P.C.; Dennis P. Clarke

(57) ABSTRACT

A portable device for taking an X-ray of a human or animal patient comprising:
- a base for positioning an X-ray cassette holder adjacent to a patient, the patient being positioned on an operating table, and an X-ray cassette holder;
- the base comprising a first plate member having an upper surface and a bottom surface, the X-ray cassette holder being positioned on the upper surface and means positioned on the bottom surface for attaching the portable device to a surface adjacent to the operating table;
- the X-ray cassette holder comprising a second plate hingedly attached to the upper surface of the first plate so that the second plate can be positioned between a storage position and a functional position;
- the second plate defining channels at opposite sides thereof for positioning an X-ray film cassette adjacent to the patient to be X-rayed;
- means for locking the second plate in the functional position; and,
- a method for employing the device to X-ray a patient.

17 Claims, 4 Drawing Sheets

PORTABLE X-RAY CASSETTE HOLDER FOR OPERATING ROOMS

BACKGROUND OF THE INVENTION

1. Field of the Invention

This invention relates to a method of X-raying and a device for holding an X-ray film cassette while an X-ray of a part of the body of either a human being or of an animal is being taken in an operating room environment.

2. Description of the Prior Art

In the operating theater it is frequently necessary to produce an X-ray or other medical image of a part of a human or animal patient that is about to undergo or is actually undergoing surgery. Such medical imaging allows for earlier diagnoses and more complete assessments as to the surgical site and the surgeon is better able to assess a favorable outcome for the surgical intervention.

With current conventional procedures and equipment, X-raying or other medical imaging procedures performed, e.g., while a patient is still under surgical anesthesia, requires the transport of the patient to an imaging facility thereby compromising surgical field sterility and risking injury to the anesthetized patient. The condition of the patients in the operating theater, however, renders it virtually impossible to move them once they have assumed the desired position on the operating table, either due to the fact that they require immediate surgery, they are anesthetized, or because they would experience severe pain if they were moved. In these circumstances, medical imaging procedures must be performed while the patient remains in the operating room. Thus, there exists a need for medical imaging to be performed while an anesthetized or otherwise immovable surgical patient lies on an operating table. Such a system affords the surgeon instant feedback as to the success of the surgery and with less likelihood of surgical field contamination. Further, such a system would provide a standard frame of reference between a body tissue and position sensing surgical aids.

Usually, the X-ray film (or other medical imaging medium) is in a cassette and it is extremely difficult, if not impossible, to position the part of the body of the patient that is to be X-rayed between the source of the X-rays and the cassette that holds the film. Thus, there also exists the need for a portable medical imaging film cassette holder that will enable the positioning of the film relative to the medical imaging apparatus and the patient to be imaged that does not require substantial movement or physical repositioning of the patient in the operating room. Currently available systems such as those marketed by AliMed, Inc. of Dedham, Mass. do not provide satisfactory results in this regard.

It is an object of the present invention to provide such a portable imaging film cassette holder device.

It is a further object of the invention to provide a novel method of medical imaging employing the device of the invention.

SUMMARY OF THE INVENTION

The above and other objects are realized by the present invention, one embodiment of which relates to a portable device for taking an X-ray of a human or animal patient comprising:

a base means for positioning an X-ray cassette holder adjacent to a patient, the patient being positioned on an operating table, and an X-ray cassette holder means;

the base means comprising a first plate member having an upper surface and a bottom surface, the X-ray cassette holder means being positioned on the upper surface and means positioned on the bottom surface for attaching the portable device to a surface adjacent to the operating table;

the X-ray cassette holder means comprising a second plate member hingedly attached to the upper surface of the first plate so that the second plate can be selectively positioned between a storage position wherein the second plate lies substantially parallel to the upper surface of the first plate and a functional position wherein the second plate is substantially vertical to the upper surface of the first plate;

the second plate defining C-shaped channels at opposite sides thereof for positioning an X-ray film cassette therein adjacent to the portion of the patient to be X-rayed when the second plate is in the functional position; and means for locking the second plate in the functional position.

Another embodiment of the invention concerns an article of manufacture comprising packaging material and a portable device for positioning a part of a patient adjacent to an X-ray film cassette for taking an X-ray contained within the packaging material, wherein the device is effective for enabling the X-raying of patients, and wherein the packaging material comprises a label which indicates that the device is so useful, and wherein the device comprises that of claim 1.

Another embodiment of the invention concerns a method of positioning a patient on an operating table and an X-ray film cassette relative to each other for the purpose of X-raying the patient comprising:

providing the device of claim 1 and attaching the device to the surface adjacent to the operating table so that the second plate is in the functional position and locked therein by the locking means;

inserting an X-ray film cassette in the C-shaped channels;

positioning the device so that X-rays passing in a given path through the patient will intersect the cassette, and transmitting X-rays along the path.

DETAILED DESCRIPTION OF THE INVENTION

Figure 1:
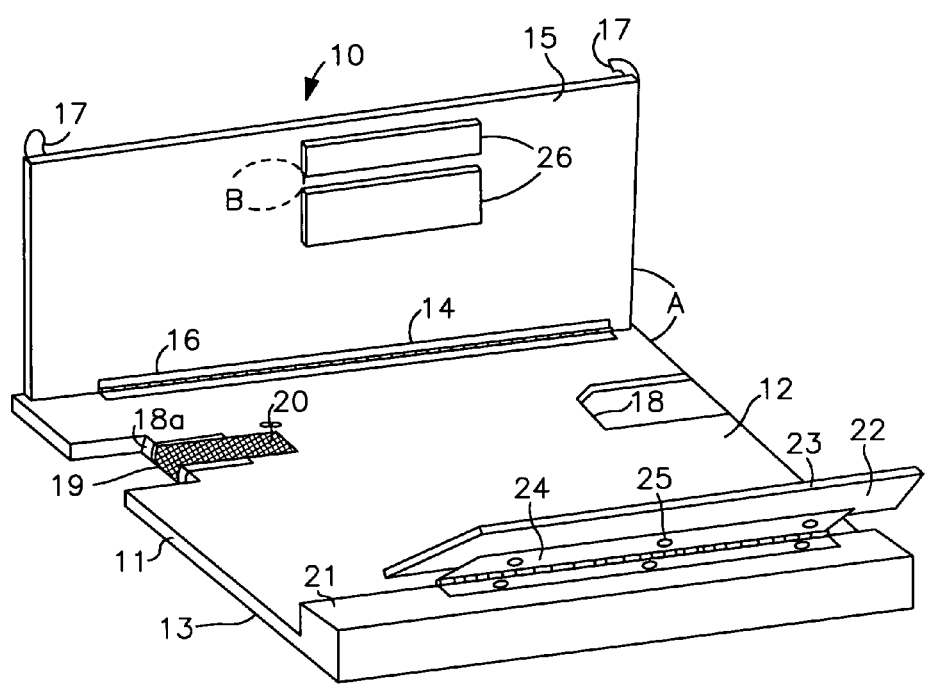
FIG. 1 is a top perspective view of the invention in its open position.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

The preferred embodiment of the device of the invention is illustrated in the drawings and described hereinbelow and is configured to be used in conjunction with a conventional Mayo stand, one type or another of which is found in virtually all operating theaters. A typical Mayo Stand is a surgical instrument holder of the type which includes a horizontally disposed tray cantilevered off a vertical support. It will be understood, however, by those skilled in the art that the device of the invention may be utilized with any stand, table or other surface positionable adjacent to or near the patient in the operating room.

An illustrative embodiment of the medical imaging film cassette holder and method of the present invention will be described with reference to following drawings in which like numerals refer to like elements, and in which FIG. 1 depicts a medical imaging film cassette holder 10 comprised of a base plate 11, having an upper surface 12 and a bottom surface 13. Hingedly attached to the upper surface 12 of base plate 111 by hinge means 14 at one side of the base plate 11 is holder plate 15. The hinged attachment allows the holder plate 15 to be selectively raised and lowered between a storage position (shown in FIG. 2) wherein the holder plate lies substantially parallel to the upper surface 12 of base plate 11 and a functional position (shown in FIG. 1) wherein said holder plate 15 is substantially vertical to the upper surface 12 of base plate 11. Hinge means 14 is attached to base plate 11 and holder plate 15 by suitable attaching means (rivets, screws and the like) 16.

Figure 2:
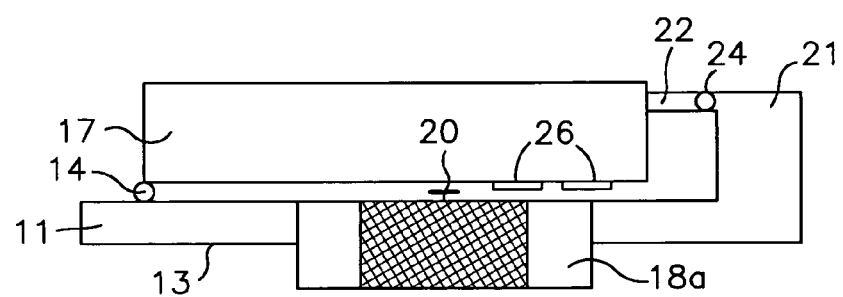
FIG. 2 is a top perspective view of the device of the invention in its storage or closed position.

The holder plate 15 also defines C-shaped channels 17 at opposite sides thereof in which a medical imaging film cassette (not shown) can be positioned adjacent to the portion of the patient to be X-rayed when the holder plate 15 is in the functional position. The C-shaped channels 16 are constructed so as to extend substantially vertical to the base plate 11 when holder plate 15 is raised to the functional position. The C-shaped channels 17 may extend on the side of the holder plate 15 that lies parallel to upper surface 12 of base plate 11 when holder plate 15 is lowered to the storage position, or they may extend on the side opposite to the side of the holder plate 15 that lies parallel to upper surface 12 of base plate 11 when holder plate 15 is lowered to the storage position, as shown in FIG. 2.

Preferably, the holder plate 15 is hingedly attached to base plate 12 so that, when raised to the functional position, is prevented by the edges of the C-shaped channels 17 from extending to a position such that the interior angle A formed between the two plates is not more than about 90°. The holder plate may be hingedly attached to base plate along substantially the entire lengths or substantially less than the entire lengths of plates 11 and 15, depending upon the degree of strength of attachment desired in any particular construction contemplated.

The bottom surface 13 of the base plate 111 is equipped with means for attaching the device 10 to the surface of, e.g., a table (preferably a Mayo stand, shown in FIGS. 3 and 4) in the operating room adjacent to the patient on the operating table to be X-rayed. As shown in FIGS. 1 and 2, the attachment means may take the form of C-shaped channels 18 and 18a extending along opposite sides of bottom surface 13 of base plate 111 such that they are substantially perpendicular to the C-shaped channels 17 of holder 15 when the latter is in the functional position (FIG. 1) and substantially parallel thereto when the holder 15 is in the storage position (FIG. 2). Channel 18a is provided with a slot in which is housed C-shaped element 19 that is slidable in the slot to adjust the distance between the C-shaped channels of elements 18 and 18a. Adjustment of this distance enables the utilization of the device of the invention with Mayo stands or other tables of varying widths. After sliding element 19 in the slot provided in element 18a to accommodate to the width of the Mayo stand or table with which the device is to be used, it is locked in place by tightening screw 20.

Figure 3:
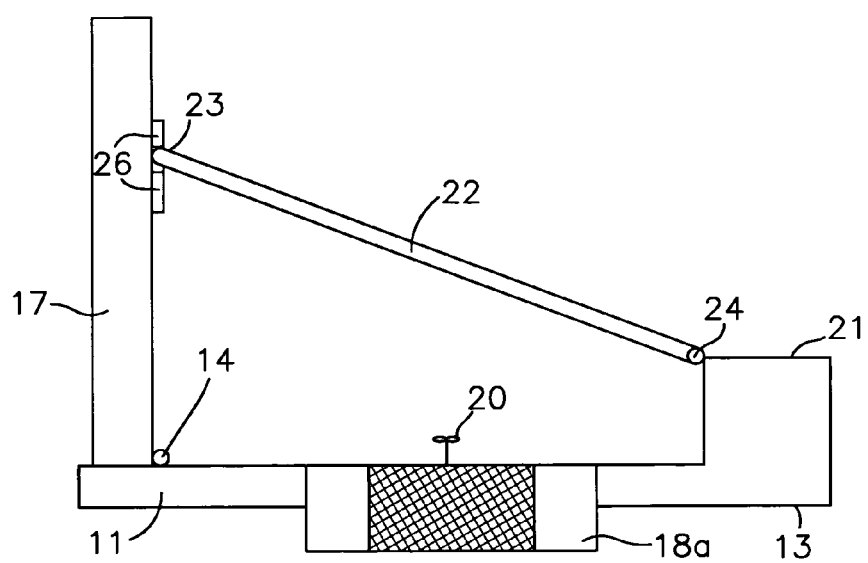
FIG. 3 is a side perspective view of the invention in its functional position.

A locking means is provided to secure holder plate 15 in the functional position when the latter is raised from its storage position. As shown in FIG. 1, the locking means takes the form of a third plate 22 attached to a side of the upper surface 12 of base plate 11 opposite to that on which the holder plate 15 is hingedly attached. Locking means 22 is preferably also hingedly attached (via rivets, screws and the like 25) and hinge means 24 to a raised edge or flange 21 extending along the side of upper surface 12 parallel to the plane of holder 15. The hinged attachment permits raising and lowering of the locking plate between positions where (1) plate 22 is in the locked position (as detailed below), (2) plate 22 may be raised so as to permit lowering of holder 15 to its storage position and (3) plate 22 may be lowered to its storage position, i.e., substantially parallel to plate 11. The raised edge 21 defines a space on upper surface 12 in which holder plate 15 may reside substantially parallel to base plate 11 when lowered to the storage position. Locking plate 22 defines an edge 23 opposite to the side hingedly attached to the raised edge 21 that engages the space designated B on the side of holder plate 15 facing locking means 22 when the holder plate is in the functional position. Space B is defined by opposing flanges 26 and is of sufficient width to (1) permit edge 23 to be rigidly and firmly engaged when locking plate is lowered to locking position (as shown in FIG. 3), (2) permit raising of plate 22 to allow holder 15 to be lowered to its storage position, and (3) permit lowering of plate 22 to its storage position, substantially parallel to base plate 11, after lowering holder plate 15 to its storage position (shown in FIG. 2). Raised edge 21 is also of sufficient height to allow the lowering of locking plate 22 to its storage position, i.e., substantially parallel to base plate 11.

A further illustrative embodiment of the invention is shown in FIG. 2 wherein device 10 is depicted in its closed or storage position.

A further illustrative embodiment of the invention is shown in FIG. 3 wherein device 10 is depicted in its locked and functional position.

Figure 4:
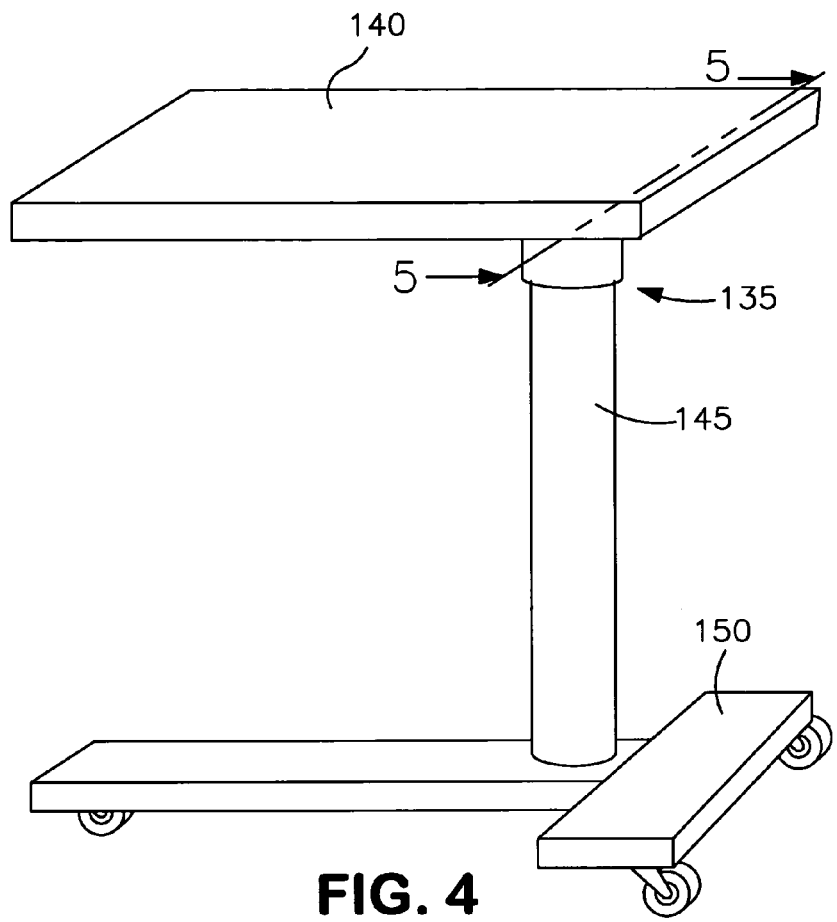
FIG. 4 is a top perspective view of a Mayo stand.

A typical Mayo stand 135 is shown in FIG. 4 and generally comprises base 150 supporting table surface 140 by means of column 145.

Figure 5:
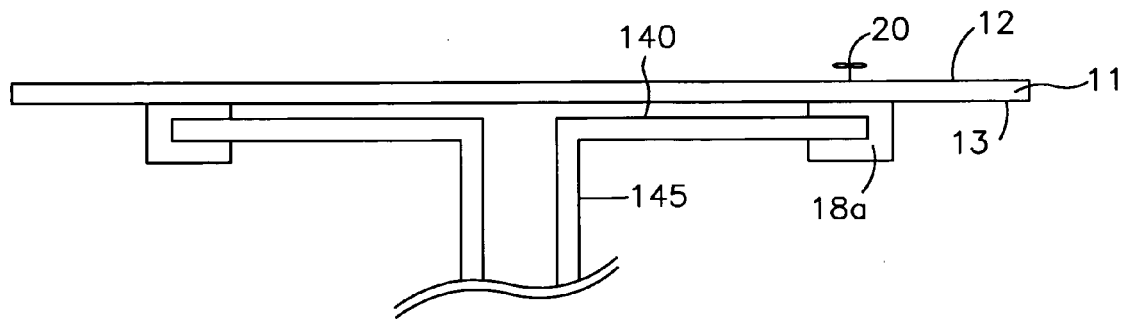
FIG. 5 is a partially cut away side perspective view of a Mayo stand having attached thereto the device of the invention along lines 5—5 of FIG. 4.

FIG. 5 depicts device 10 attached to table surface 140 by means of C-channels 18 and 18a that are adapted to slide over and surround the edges of surface 140. The distance between elements 18 and 18a may be adjusted to fit the width of table surface 140 by sliding element 19 (not visible in FIG. 5) and tightening with screw 20.

It will be understood that the holder 10 may be constructed of any material suitable for a medical imaging environment. Preferably, the plates 11 and 15 are constructed of a medically acceptable rigid or semirigid material such as a plastic, e.g., PVC, ABS and the like. The dimensions of the holder 10 and its principal components, base plate 11, holder plate 15, C-shaped channels 17, attachment means 18, locking means 22, hinge means 14 and 24, raised edge 21 and flanges 26 are not overly critical, will depend upon the intended use and application of the device and are well within the purview of one skilled in the art without resort to undue experimentation. The thickness of the base plate 11 should be sufficiently thick so as to form a flange surface that prevents extension of the holder plate 15 to a position such that the interior angle A formed between the two plates is not more than about 90°. The holder plate should be of dimensions that will allow imaging of any desired portion of the patient's body.

Thus, it can be seen that the portable film cassette holder 10 of the present invention provides for convenient placement of a film cassette adjacent a patient on an operating table for imaging of a desired portion of the patient's anatomy.

The invention also provides a method of positioning a human or animal patient and a medical imaging film cassette relative to each other for the purpose of imaging the patient. Employing the device depicted in the drawings, the holder plate 15 is raised to the functional position shown in FIG. 1, an X-ray film cassette, for example, is inserted in the C-shaped channels 18, the device is positioned on a Mayo stand as shown in FIG. 4 adjacent to a patient on the operating table, such that the portion of the patient desired to be imaged is adjacent the cassette and such that X-rays passing in a given path through the patient will intersect the cassette, and X-rays are transmitted along the path. Following completion of the imaging procedure, the Mayo stand is wheeled away from the operating table, the device is removed from the Mayo stand and collapsed to the closed or storage position shown in FIG. 2.

It will be understood by those skilled in the art that the medical imaging film cassette holder device of the invention may take any desired shape, depending upon its intended function. It will also be understood by those skilled in the art that, although the device disclosed herein has been illustrated as being utilized for X-ray imaging, it may also be used in connection with any type of medical imaging requiring the use of a film cassette.

What is claimed is:

1. A portable device for taking an X-ray of a human or animal patient comprising:
    a base means for positioning an X-ray cassette holder adjacent to a patient, said patient being positioned on an operating table, and an X-ray cassette holder means;
    said base means comprising a first plate member having an upper surface and a bottom surface, said X-ray cassette holder means being positioned on said upper surface and means positioned on said bottom surface for attaching said portable device to a surface adjacent to said operating table;
    said X-ray cassette holder means comprising a second plate member hingedly attached to said upper surface of said first plate so that said second plate can be selectively positioned between a storage position wherein said second plate lies substantially parallel to said upper surface of said first plate and a functional position wherein said second plate is substantially vertical to said upper surface of said first plate;
    said second plate defining C-shaped channels at opposite sides thereof for positioning an X-ray film cassette therein adjacent to a portion of the patient to be X-rayed when said second plate is in said functional position; and
    means for locking said second plate in said functional position.

2. The device of claim 1 wherein said surface adjacent to said operating table is the top surface of a table.

3. The device of claim 1 wherein said surface adjacent to said operating surface is the top surface of a Mayo stand.

4. The device of claim 1 wherein said means positioned on said bottom surface of said first plate for attaching said portable device to said top surface of said Mayo stand comprise means adjustable to accommodate attachment to the top surfaces of Mayo stands of varying sizes and shapes.

5. The device of claim 3 wherein said means positioned on said bottom surface of said first plate for attaching said portable device to said top surface of said Mayo stand comprise C-shaped channels extending along opposite sides of said first plate adapted for engaging opposite edges of the top surface of said Mayo stand to fixedly position said base means thereon.

6. The device of claim 5 wherein said C-shaped channels on said bottom surface of said first plate extend substantially vertically to said C-shaped channels in said second plate when said second plate is in said functional position and are substantially parallel with said C-shaped channels in said second plate when said second plate is in said storage position.

7. The device of claim 1 wherein said second plate is substantially rectangular in shape.

8. The device of claim 7 wherein said second plate is hingedly attached to said upper surface of said first plate at one side thereof.

9. The device of claim 8 wherein said second plate is hingedly attached to said upper surface of said first plate along substantially the entire or substantially less than the entire length of either said side of said first plate or a side of said rectangular second plate.

10. The device of claim 1 wherein said C-shaped channels extend on the side opposite to the side of the second plate that lies parallel to said first plate when said second plate is in said storage position.

11. The device of claim 1 wherein said means for locking said second plate in said functional position is a third plate member hingedly attached to said upper surface of said first plate such that the third plate can be positioned so as to lock said second plate in said functional position and such that said third plate can be positioned to overlay substantially parallel to second plate when said second plate is in said storage position.

12. The device of claim 1 wherein said first, second, and third plates are constructed of medically acceptable rigid or semirigid plastic.

13. The device of claim 12 wherein said plastic is PVC or ABS.

14. An article of manufacture comprising packaging material and a portable device for positioning a part of a patient adjacent to an X-ray film cassette for taking an X-ray contained within said packaging material, wherein said device is effective for enabling the X-raying of patients, and wherein said packaging material comprises a label which indicates that said device is so useful, and wherein said device comprises that of claim 1.

15. A method of positioning a patient on an operating table and an X-ray film cassette relative to each other for the purpose of X-raying said patient comprising:
    providing said device of claim 1 and attaching said device to said surface adjacent to said operating table so that said second plate is in said functional position and locked therein by said means for locking;
    inserting an X-ray film cassette in said C-shaped channels;
    positioning said device so that X-rays passing in a given path through said patient will intersect said cassette, and
    transmitting X-rays along said path.

16. The method of claim 15 wherein said surface adjacent to said operating table is a tabletop surface.

17. The method of claim 15 wherein said surface adjacent to said operating surface is the top surface of a Mayo stand.

* * * * *